D. J. POWERS.
FLUID MIXER.
APPLICATION FILED JUNE 25, 1920.
1,373,634.
Patented Apr. 5, 1921.
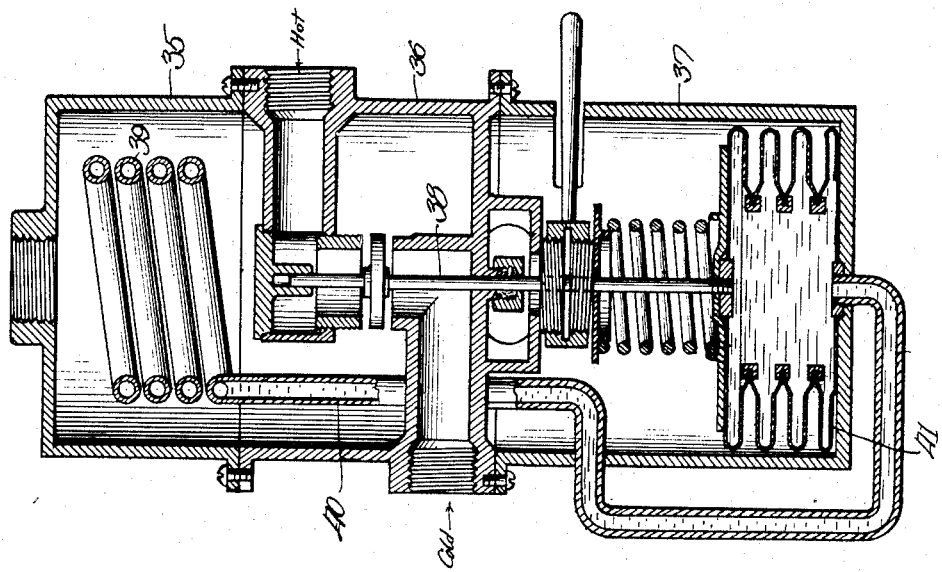
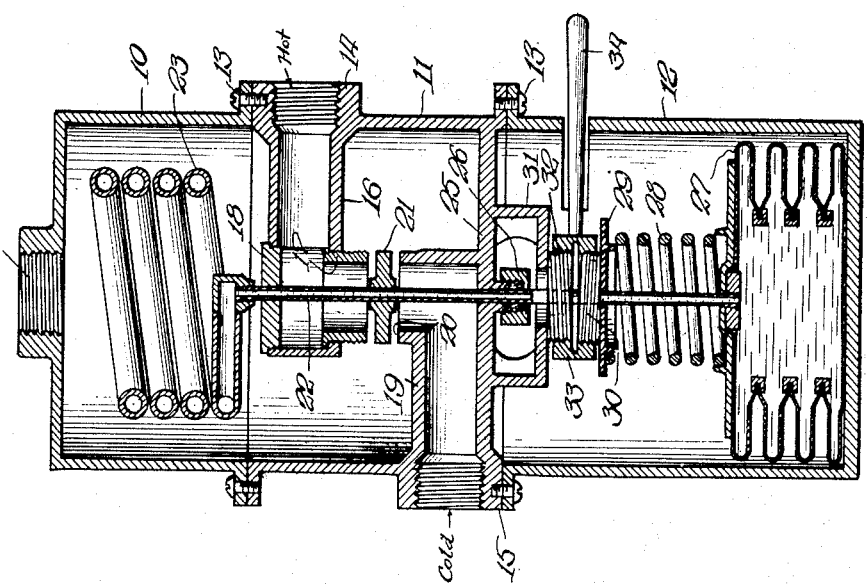

UNITED STATES PATENT OFFICE.

DONALD J. POWERS, OF DOBBS FERRY, NEW YORK, ASSIGNOR TO THE POWERS REGULATOR COMPANY, OF CHICAGO, ILLINOIS, A CORPORATION OF ILLINOIS.

FLUID-MIXER.

1,373,634.      Specification of Letters Patent.      Patented Apr. 5, 1921.

Application filed June 25, 1920. Serial No. 391,780.

*To all whom it may concern:*

Be it known that I, DONALD J. POWERS, a citizen of the United States, and resident of Dobbs Ferry, in the county of Westchester and State of New York, have invented certain new and useful Improvements in Fluid-Mixers, of which the following is a specification.

My invention relates to thermostatic hot and cold fluid mixers and particularly to an improvement in constructions shown in Patents 1,195,722, dated August 29, 1916, to Powers and Snediker, and 1,243,999, dated October 23, 1917, to Snediker.

An object of the improvement herein described is to provide means whereby the flexible bellows, which are adapted to contain thermostatic liquid, are removed from both the temperature and pressure of the mixing chamber. By avoiding the temperature of the chamber the construction of the bellows is more stable and the difficulties heretofore encountered, such as the melting of solder, are avoided. A further object is in that much greater force is exerted by the bellows when the expansion is internal rather than external, as in types heretofore commonly employed. A further advantage is in that by mounting the parts in the position shown the bellows are always filled with liquid and the expansion thereof is uniform, thus tending to evenly distribute the strain. A still further object is to simplify the construction of devices of this sort and thereby lessen the cost thereof.

The invention will be more readily understood by reference to the accompanying drawing in which Figure 1 is a sectional view through a regulator constructed in accordance with my invention, and, Fig. 2 is a similar view through a slightly modified form of the device.

In the drawing it will be seen that I provide a casing composed of three parts 10, 11 and 12, joined by suitable means such as the screws 13, which engage flanges or ears provided thereon. The intermediate section 11, provides inlets 14, 15, for hot and cold fluids respectively. The inlet connection 14, has an extension 16, within the casing which is shaped to provide a removable valve seat 17, which is inserted through an opening closed by a cap 18. The cold inlet is likewise provided with an extension 19, which terminates in a seat 20, the seats 20, 17, being alined and arranged in opposed relation. A valve member 21, is mounted in the space between the two seats, the member or disk being secured to a hollow stem 22, which projects through the cap 18, and is firmly fixed to a coil 23, of tubing of thin section, the extremity of which is closed and the interior of which is in communication with the hollow stem. The coil is free of attachment and moves vertically with the valve member. It is mounted within the upper section 10, of the casing, which section provides an outlet connection 24, for the tempered liquid. The hollow stem 22, projects downwardly through the lower wall 25, of the section 11, a tight connection being secured by means of a gland 26. The stem is connected at its lower end to a bellows 27 of common form, which is seated within the lower section 12, of the casing. The lower wall of the bellows is firmly seated against the bottom wall of the casing, the upper wall of the bellows being free to move vertically and carry the stem with it, the expansion being resisted by means of a spring 28, seated at one end against the upper wall of the bellows and at the opposite end against a spring cap 29. Also carried by the cap 29, is a threaded projection 30, having left-hand threads. Projecting downwardly from an extension 31, of the lower wall 25, is a similar extension 32, having right-hand threads. A sleeve 33, engages the threaded projections, the sleeve being controlled by an operating arm 34. It will be seen that by oscillating the arm 34, the spring may be compressed and permitted to expand in order to secure adjustment thereof as required.

It will be noted also that the side of the casing adjacent the gland is open to permit tightening of the gland nut to overcome leakage.

The bellows, coil and valve stem are filled with a low boiling point liquid, or if desired, the bellows may be filled with an inert liquid, the coil alone containing a volatile liquid. Such liquids will be selected as do not combine and thus there will be no effect of exterior heat or cold on the liquid contained in the bellows.

As the cold and hot liquids enter the mixing chamber the temperature thereof will be communicated to the volatile liquid in the coil and if the temperature is too hot, the expansive force developed therein will tend to expand the bellows thus lifting the valve toward the hot liquid inlet and restricting the amount of such liquid admitted. The coil, which is rigid and non-collapsible, moves vertically with the valve.

In the construction shown in Fig. 2, which construction is diagrammatic in certain particulars, the casing 35, 36, 37, is the same and the remainder of the parts are substantially identical with those just described except in that the valve stem 38, is not hollow and is not connected to the coil 39. The coil is connected by means of the tube 40, to the bellows 41, and the expansion and contraction of the bellows effects the movement of the valve without a corresponding movement of the coil 39. The operation is the same as that heretofore described.

It will be noted that in both of the constructions the bellows is removed from the zone of the mixed fluids and from the pressure exerted by such fluids. Furthermore, that the expansion of the bellows is internal rather than external and is therefore more uniform. This results in longer life and better service for the bellows.

Obviously the construction is capable of much modification and I do not wish to be limited except as indicated in the appended claims.

I claim:

1. In a thermostatically controlled hot and cold fluid mixer, the combination of a casing having a mixing chamber and provided with inlets for hot and cold fluid and an outlet for the combined fluids, a valve for controlling the entrance of the hot and cold fluids, a container for a thermostatic liquid located within the mixing chamber, an expansible and collapsible chamber located exteriorly of the mixing chamber and also adapted to contain thermostatic liquid, a conduit connecting said chambers, and a connection between the expansible and collapsible chamber and said valve for operating the valve, substantially as described.

2. In a device of the class described, the combination of a casing provided with a mixing chamber and having inlets for hot and cold fluid and an outlet for the combined fluids, a valve for controlling the quantities of the respective fluids allowed to enter said chamber, a rigid container for thermostatic liquid mounted within said chamber, a bellows mounted exteriorly of the chamber and connected through a wall of the chamber with said valve for moving the same, and a conduit connecting the interiors of the rigid container and the bellows, substantially as described.

3. In a device of the class described, the combination of a casing providing a mixing chamber, hot and cold inlet pipes projecting into said chamber and providing alined outlets, a valve mounted for reciprocation between said outlets, a rigid container for thermostatic liquid mounted within said chamber, a bellows mounted exteriorly of the chamber, and a hollow stem on which said valve is mounted, said stem being connected to and providing communication between the interiors of said container and bellows, substantially as described.

4. In a device of the class described, the combination of a casing providing a mixing chamber, hot and cold fluid inlet pipes providing opposed seats within said chamber, a valve adapted to reciprocate between said seats, a hollow valve stem, a rigid thermostatic fluid container within the chamber and connected to one end of said stem, a bellows mounted exteriorly of the chamber and connected to the other end of said stem, and a spring tending to compress said bellows, substantially as described.

5. In a device of the class described, the combination of a casing having hot and cold fluid inlets providing opposed seats within said chamber, a valve mounted between said seats, a valve stem projecting through a wall of said chamber, a bellows mounted exteriorly of the chamber and connected to said stem, and a thermostatic liquid container mounted within the chamber and connected to the opposite end of said stem and movable with the valve, the stem being hollow to provide communication between the interiors of the container and bellows, substantially as described.

6. In a device of the class described, the combination of a casing having hot and cold fluid inlets providing opposed seats within said chamber, a valve mounted between said seats, a valve stem projecting through a wall of said chamber, a bellows mounted exteriorly of the chamber and connected to said stem, a thermostatic liquid container mounted within the chamber and connected to the opposite end of said stem and movable with the valve, the stem being hollow to provide communication between the interiors of the container and bellows, a spring tending to collapse said bellows, and means for regulating the force exerted by said spring, substantially as described.

7. In a device of the class described, the combination of a casing providing a mixing chamber and having inlets for hot and cold fluid, a valve for controlling the admission of said fluids, a rigid container for thermostatic liquid mounted within the chamber, a hollow valve stem connected to said container whereby the container is movable with the valve, and a bellows exteriorly mounted and having its movable wall connected to an end of said hollow stem, substantially as described.

Signed at New York city, this 6th day of May, 1920.

DONALD J. POWERS.